Figure 1:
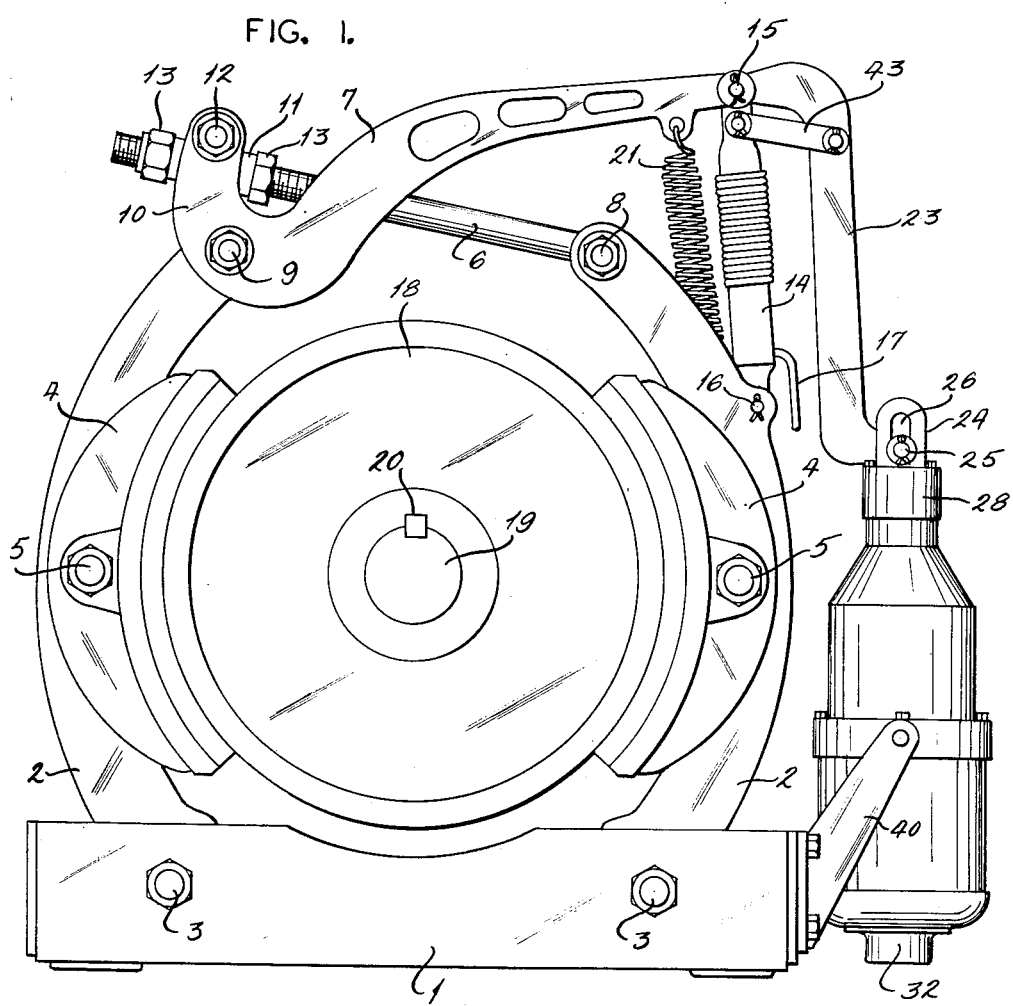

March 10, 1953 B. L. BRITT 2,631,266
DELAYED-ACTION CONTROL FOR INDUSTRIAL BRAKES
Filed Oct. 27, 1949 2 SHEETS—SHEET 1

INVENTOR:
Bryant L. Britt,
By Carr & Carr & Gravely,
HIS ATTORNEYS.

March 10, 1953  B. L. BRITT  2,631,266
DELAYED-ACTION CONTROL FOR INDUSTRIAL BRAKES
Filed Oct. 27, 1949  2 SHEETS—SHEET 2

INVENTOR:
Bryant L. Britt,
By Carr & Carr & Gravely,
HIS ATTORNEYS.

Patented Mar. 10, 1953

2,631,266

UNITED STATES PATENT OFFICE 2,631,266

DELAYED-ACTION CONTROL FOR INDUSTRIAL BRAKES

Bryant L. Britt, Webster Groves, Mo., assignor to Wagner Electric Corporation, St. Louis, Mo., a corporation of Delaware Application October 27, 1949, Serial No. 123,922

8 Claims. (Cl. 318—364)

1

This invention relates to industrial brakes, particularly combination service and parking brakes for electrically operated traveling cranes.

One of the objects of the invention is to permit manual control of the brakes independently of the mechanism for applying the brake for parking purposes.

Another object of the invention is to provide for automatically applying the brakes when the electric power for operating a crane is cut off by the operator.

A further object of the invention is to prevent application of the brakes during short interruptions of the electric motive power for the crane.

A still further object of the invention is to provide a parking mechanism for industrial brakes which is not sensitive to temperature conditions and whose operation will not be affected by vibration of the parts or by the entry of foreign matter into the brake operating mechanism.

The invention consists in mechanism for preventing instant application of the brake during momentary interruption of the electric motive power supplied to the machine controlled thereby and in the parts and arrangements and combinations of parts hereinafter described and claimed.

Figure 4:
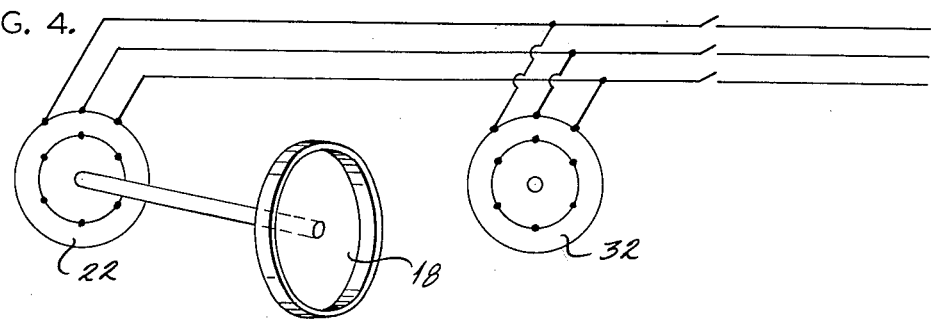
Figure 2:
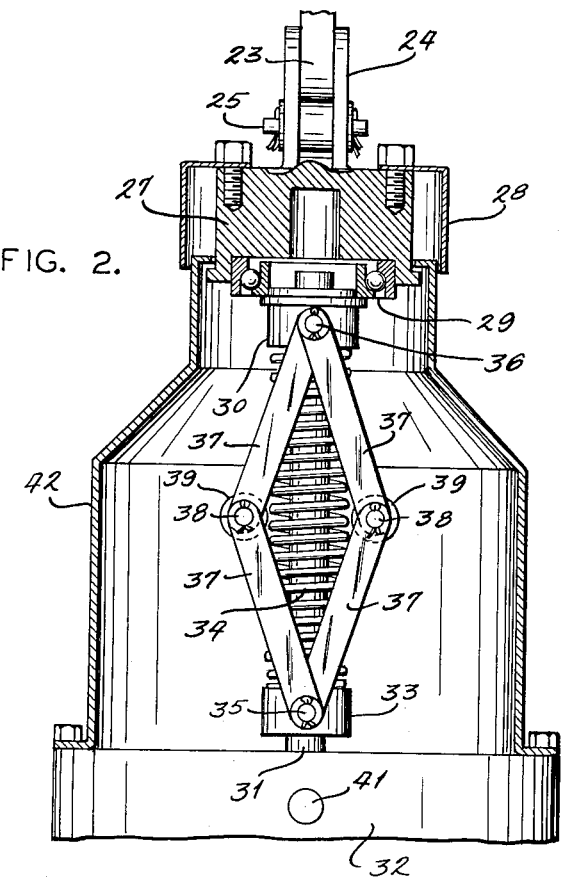
Figure 3:
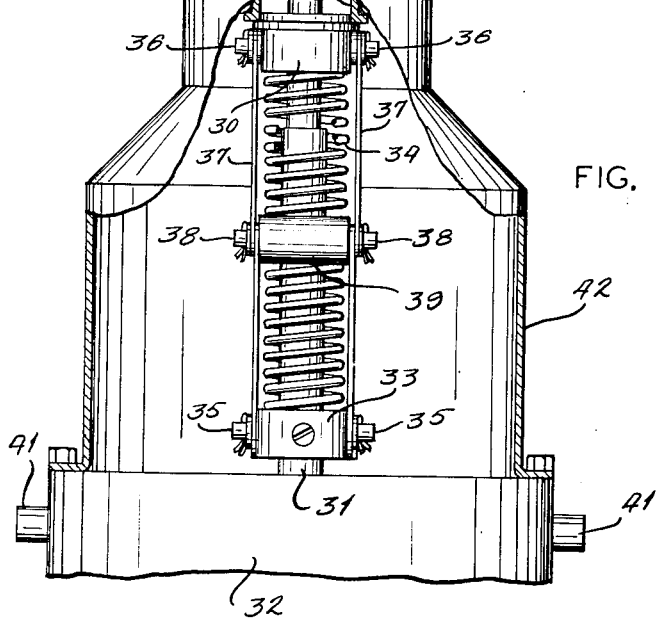

In the drawings:

Fig. 1 is a side elevational view of an industrial brake provided with the improved parking brake operating mechanism applied thereto, Fig. 2 is an elevational view, partly in section, of the parking brake operating mechanism, Fig. 3 is an elevational view, partly in section, of the device shown in Fig. 2 but rotated 90 degrees; and Fig. 4 is a wiring diagram of the electrical apparatus employed in the brake.

In the embodiment of the invention illustrated in the drawings, the numeral 1 designates a frame which forms part of a traveling crane and on which upright brake arms 2 are pivotally supported at their lower ends on anchor pins 3. Brake shoes 4 are secured to the brake arms 2 by means of bolts 5 and have a limited amount of pivotal motion thereon. The unpivoted upper ends of the brake arms 2 are connected together by a rod 6 and a lever 7. The rod 6 is pivoted to one of the arms 2 by means of a pin 8, the lever 7 being pivoted to the other arm by means of pin 9. The lever 7 has an angularly disposed member 10 integral therewith to which a knuckle 11 is pivotally secured by means of a knuckle bolt 12. The rod 6 extends through the knuckle

2

11 and is adjustably mounted therein by means of a pair of adjusting nuts 13. A hydraulic motor 14 is pivoted to the lever arm 7 by means of a pin 15 and is also pivoted to one of the brake arms by means of a pin 16. An inlet conduit 17 leads to the hydraulic motor 14 for supplying fluid under pressure thereto from a suitable source of supply.

The brake shoes 4 are engageable with a brake wheel 18 secured to a shaft 19 by means of a key 20. The shoes are maintained in disengaged position by means of a return spring 21, one end of which is anchored to lever 7 and the other end to one of the brake arms 2. The shaft 19 is connected to an electric driving motor 22 (Fig. 4) which forms part of the operating mechanism of the crane with which the brake assembly is associated.

Means is provided for controlling the application of the brake shoes 4 to the brake wheel 18 in the event of momentary failure of power supply to the driving motor 22. This mechanism consists of an upright lever 23, the upper end of which is pivoted to the pin 15, the lower end being slidably received in a clevis 24. A pin 25 is inserted in the lower end of the lever 23 and is received in slots 26 in the clevis 24. The clevis is fixed to the top of a head 27 to which a shield 28 is secured which projects downwardly so as to surround said head. An end thrust bearing 29 is secured in a bore in head 27 and a spring stop 30 is received in bearing 29. A shaft 31, which is an upward extension of the armature shaft of an electric motor 32, is slidably received in the spring stop 30, a second spring stop 33 being secured to shaft 31 adjacent to the motor 32. A spring 34, whose strength is higher than that of spring 21, is interposed between spring stops 30 and 33. The spring stops 30 and 33 are provided with pins 35 and 36 and a plurality of levers 37 are pivotally secured to these pins. The levers 37 are pivoted together by means of pins 38, flyweights 39 being provided on pins 38 between levers 37 and disposed on opposite sides of the spring 34 and shaft 31. The motor 32 is pivotally secured to brackets 40 which in turn are secured to the frame 1, the motor 32 being supported on trunnions 41 journaled in said brackets. The motor 32 is connected in parallel with motor 22 so that upon the closing of the circuit thereto, both motors will start simultaneously and in the same manner. The above control mechanism is encased in a suitable housing 42. A link 43 connected between motor 14 and lever 23 compels the latter to move parallel with the motor 14.

Under normal conditions of operation, the master cylinder connected to the fluid motor 14 is operable to overcome the force of the return spring 21, thus causing the brake shoes 4 to be applied to the brake wheel 18. When power is applied to the motor 32 it rotates at such speed that spring 34 is compressed by the centrifugal action of flyweights 39. When power is removed from motor 32, spring 34 will act on movable spring stop 30, moving the clevis 24 and its head 27 upwardly until the lower end of the slot 26 in the clevis contacts the pin 25, whereupon it will act on lever 23 which will move lever 7 upwardly and overcome the tension of spring 21, thus applying the brake shoes 4 to the brake wheel 18. In the event of momentary failure of power in the lines supplying power to the motors, the automatic application of the brake shoes 4 to the brake wheel will be delayed by reason of the flyweights 39 acting on spring 34. When the motor 32 stops, spring 34 will force stop 30 upwardly, thereby causing clevis 24 to move upwardly carrying with it lever 23, thereby applying the brake shoes 4 to the brake wheel 18. One application of the brake illustrated is on traveling crane bridges where it is desirable that the brake be applied when the bridge is at rest in order that it may remain parked until it is intentionally moved. There are several advantages in delaying the application of the brake shoes to the wheel, such as occurs when power failure is only momentary, which will enable the bridge to continue its travel without having to start again from "rest" position.

Another advantage derived from delaying application of the brake shoes is in installations where the crane trolley is made up in sections, each section being insulated one from the other. In this case, when the crane is in operation, the delay mechanism will permit the crane to traverse the insulating member of the trolley without coming to rest.

A further advantage of the mechanism described is that the control device can be utilized in localities where high ambient temperatures would prevent the use of hydraulic systems.

A still further advantage of this mechanism is that its operating parts are of such a nature that they can operate in a dusty atmosphere without interfering with the normal functioning of the high speed members therein that can be sealed against these conditions.

What I claim is:

1. A brake mechanism comprising a rotatable brake wheel, a pair of brake shoes engageable with said wheel, a spring for biasing said shoes to disengaged position, a hydraulic motor for overcoming the action of said biasing spring and for applying said shoes to said wheel, a spring having a strength higher than that of said biasing spring for applying said shoes to said wheel, a rotatable electric motor pivoted to said mechanism; and inertia means driven by said rotatable motor for delaying the action of said higher strength spring.

2. A brake mechanism comprising a rotatable brake wheel, a pair of brake shoes engageable with said wheel, a spring for biasing said shoes to disengaged position, a hydraulic motor for overcoming said biasing spring and for applying said shoes to said wheel, a spring having a strength higher than that of said biasing spring for applying said shoes to said wheel, a rotatable motor pivoted to said mechanism; and means driven by said rotatable motor for regulating and delaying the action of said higher strength spring in applying said shoes to said wheel.

3. A brake mechanism comprising a rotatable brake wheel, a motor for rotating said wheel, a pair of brake shoes engageable with said wheel, a spring for biasing said shoes to their disengaged position, a hydraulic motor for overcoming said biasing spring and for applying said shoes to said wheel, a spring having a strength higher than that of the biasing spring for overcoming said biasing spring and for applying said shoes to said wheel, a second motor driven in timed relation to said brake wheel motor; and a rotatable inertia device driven by said second mentioned motor and acting on said higher strength spring for delaying the action thereof in overcoming said biasing spring and for applying said shoes to said wheel.

4. A brake mechanism comprising a brake wheel, a frame, a pair of brake shoes pivotally mounted on said frame and engageable with said wheel, a spring for biasing said shoes to disengaged position, a hydraulic motor for overcoming the action of said biasing spring and for applying said shoes to said wheel, a second spring having a strength higher than that of said biasing spring, a motor pivotally supported on said frame; and an inertia device rotated by said pivoted motor, said inertia device restraining the action of said higher strength spring for delaying the action thereof in applying said shoes to said wheel.

5. A brake mechanism comprising a rotatable brake wheel, a motor for rotating said wheel, a frame, a pair of brake shoes one end of each being pivoted to said frame, lever means connected between the other ends of said shoes, a spring acting on said lever means for biasing said shoes to disengaged position, a hydraulic motor acting on said lever means for overcoming the action of said biasing spring and for applying said shoes to said wheel, a spring having a strength higher than that of said biasing spring for overcoming the action of said biasing spring and for applying said shoes to said wheel, a motor pivoted to said frame, an inertia device rotated by said motor in timed relation to the rotation of said wheel motor, said inertia device acting on and delaying the action of said higher-strength spring; and means connected between said inertia device and said lever means for transmitting the motion of said inertia device to said lever.

6. A brake mechanism comprising a rotatable brake wheel, a motor for rotating said wheel, a pair of brake shoes engageable with said wheel, a spring for biasing said shoes to disengaged position, a spring having a strength higher than that of the biasing spring for overcoming said biasing spring and for applying said shoes to said wheel, a second motor driven in timed relation to said brake wheel motor; and a rotatable inertia device driven by said second mentioned motor and acting on said higher strength spring for delaying the action in overcoming said biasing spring and for applying said shoes to said wheel.

7. A brake mechanism comprising a rotatable brake wheel, a motor for rotating said wheel, a frame, a pair of brake shoes one end of each being pivoted to said frame, lever means connected between the other ends of said shoes, a spring acting on said lever means for biasing said shoes to disengaged position, a spring having a strength higher than that of said biasing spring for overcoming the action of said biasing spring and for applying said shoes to said wheel, a motor pivoted to said frame, an inertia device rotated by said motor in timed relation to the rotation of said wheel motor, said inertia device acting on and delaying the action of said higher strength spring; and means connected between said inertia device and said lever means for transmitting the motion of said inertia device to said lever.

8. A brake mechanism comprising a brake wheel, brake shoes engageable with said wheel, spring means for biasing said brake shoes out of engagement with said wheel; and means for overcoming the force of said spring means and moving said shoes into engagement with said wheel, said means consisting of a rotating inertia system supplied with driving power from the same source that supplies power to the prime mover for said brake and controlled by the same control that controls the prime mover.

BRYANT L. BRITT.

REFERENCES CITED

The following references are of record in the file of this patent:

UNITED STATES PATENTS

| Number | Name | Date |
| --- | --- | --- |
| 982,695 | Sundh | Jan. 24, 1911 |
| 2,270,417 | Cox | Jan. 20, 1942 |
| 2,345,203 | LaVia | Mar. 28, 1944 |
| 2,422,370 | Schnell | June 17, 1947 |